US005141586A

United States Patent [19]
Myers et al.

[11] Patent Number: 5,141,586
[45] Date of Patent: Aug. 25, 1992

[54] BONDER FOR RELINING TORQUE CONVERTER LOCK-UP PISTONS

[76] Inventors: John E. Myers, 1752 Sabatino Dr., Sparks, Nev. 89431; Roy Proctor, 8200 Offenhauser, #114C, Reno, Nev. 89511

[21] Appl. No.: 563,925

[22] Filed: Aug. 7, 1990

[51] Int. Cl.[5] .......................... B32B 31/20; F16P 3/00; G05G 15/00; B30B 15/34

[52] U.S. Cl. .................................. 156/358; 100/93 P; 156/365; 156/381; 156/583.1

[58] Field of Search ...................... 156/583.1, 288, 581, 156/381, 352, 358, 365; 100/93 P, 93 PB, 295, 240

[56] References Cited

U.S. PATENT DOCUMENTS

| | | | |
|---|---|---|---|
| 2,874,751 | 2/1959 | Norton | 100/93 P |
| 2,934,129 | 4/1960 | Wilson et al. | 156/365 X |
| 3,047,051 | 7/1962 | Matveeff | 100/93 P |
| 3,139,816 | 7/1964 | Jemison et al. | 100/93 P |
| 3,236,714 | 2/1966 | Traut | 156/583.1 X |
| 3,241,189 | 3/1966 | Siempelkamp | 100/93 P X |
| 3,770,550 | 11/1973 | Levitan | 156/583.1 X |
| 3,977,535 | 8/1976 | Häsges et al. | 156/583.1 X |
| 4,365,547 | 12/1982 | McClure, Jr. | 156/583.1 X |
| 4,612,081 | 9/1986 | Kasper et al. | 156/583.1 |

FOREIGN PATENT DOCUMENTS

| | | | |
|---|---|---|---|
| 2109539 | 9/1972 | Fed. Rep. of Germany | 156/583.1 |

*Primary Examiner*—Michael W. Ball
*Assistant Examiner*—Adrienne C. Johnstone
*Attorney, Agent, or Firm*—Chernoff, Vilhauer, McClung & Stenzel

[57] ABSTRACT

Apparatus and a method for attaching replacement frictional lining material to a face of a lock-up piston for a torque converter of an automatic transmission. A housing encloses a pair of pressure plates which are electrically heated to automatically-controlled temperatures. A cylinder-and-piston assembly carries one of the pressure plates between an open position permitting a lock-up piston and a replacement friction lining material to be placed atop the other pressure plate. Closure of the door of the housing initiates an automatic cycle of application of pressure for a predetermined amount of time during which the heated pressure plates activate an adhesive material. An automatic timing device is adjustable to control the duration of application of pressure through operation of an electrically-controlled air valve.

8 Claims, 5 Drawing Sheets

BONDER FOR RELINING TORQUE CONVERTER LOCK-UP PISTONS

BACKGROUND OF THE INVENTION

The present invention relates to automatic transmissions in which the torque converter is locked by a clutch mechanism to prevent slippage at certain times, and particularly to an apparatus and method for attachment of replacement frictional lining material to a lock-up piston face.

In order to obtain better efficiency, some automatic transmissions for automobiles include a clutch mechanism which, when engaged, locks the turbine portions of the torque converter to each other to prevent relative movement, and thus transmits power directly from the engine to the gearbox without slippage of the torque converter. In such transmissions the clutch includes a "lock-up" piston having a lining of frictional material which is held in contact with another portion of the torque converter to lock up the torque converter. Ordinarily the torque converter is "locked up" only when the vehicle is operating at highway speeds.

As part of the course of rebuilding an automatic transmission including the torque converter lock-up capability, it is necessary to replace the worn lining of frictional material, which is bonded adhesively to the lock-up piston. The lock-up piston must be prepared by removal of all traces of the original friction lining and adhesive materials, and a new annular lining ring of frictional material, furnished pre-coated with an adhesive, must then be fastened to the lock-up piston. The process of installing the new lining requires attachment to the lock-up piston through the application of high temperature and pressure to activate the adhesive material.

Previously, the required pressure and temperature have been obtained by transmission rebuilding shops only by the use of multiple clamps, heating the lock-up piston after the replacement lining material has been clamped to the piston by placing the clamped piston and friction material in an oven for a relatively long time. Adhesive bonding of frictional linings to lock-up pistons in this manner not only requires longer time than is desired, but utilizes undesirably large amounts of energy to heat the lock-up piston and lining in an oven. In addition, this method requires more labor than is desired, as well as a considerable amount of care, in placement of the lining material on a lock-up piston and in maintaining that position during attachment of clamps prior to heating of the entire assembly.

What is desired, therefore, is an improved apparatus and method for attaching replacement frictional lining material to a lock-up piston for a torque converter of an automatic transmission. Preferably, such apparatus should easily and automatically provide the required temperature and pressure, concentrated where required to attach a frictional lining to a lock-up piston quickly and easily and with safety to the operator.

SUMMARY OF THE INVENTION

The present invention provides a bonder apparatus for attaching a replacement ring of frictional lining material to a face of a lock-up piston for a torque converter for an automatic transmission and for automatically providing the required temperature and pressure for activating an adhesive material to fasten the lining to the lock-up piston permanently. In accordance with the invention, a pair of opposed pressure plates have pressure surfaces of the appropriate shapes and sizes to receive a lock-up piston and a replacement ring of frictional lining material already coated with an adhesive. One pressure plate is relieved so that it contacts only the appropriate portions of the lock-up piston, in a preferred embodiment of the invention.

Both of the pressure plates are supported on heating plates which include electrical resistance heating elements and temperature sensors utilized in controlling the operation of the heating elements to maintain the heating plates at desired temperatures. One of the pressure plates is carried operatively connected with a cylinder-and-piston assembly utilized to move the pressure plate and provide the required pressure while heat is applied through both of the pressure plates to activate an adhesive material to attach the ring of frictional lining material to the lock-up piston's face.

In a preferred embodiment of the invention a strong enclosure surrounds the heating plates, pressure plates, a lock-up piston, and associated replacement lining material. A door-operated interlock switch initiates automatically controlled operation of the heater plates and cylinder and piston assembly for a preprogrammed time at a required temperature to achieve satisfactory adhesive bonding of the ring of frictional lining material to the lock-up piston's face.

Preferably the pressure plates are easily removable and replaceable with pressure plates specifically designed to receive a particular type of lock-up piston and replacement frictional lining material, so that the apparatus is usable with many different types of automatic transmission lock-up pistons.

In accordance with the method of the invention, a lock-up piston is placed atop a first pressure plate, a replacement friction lining is placed atop the lock-up piston, and a second pressure plate is utilized to force the lining material against the lock-up piston while both of the pressure plates are kept heated to a required temperature and pressure is maintained for a required amount of time.

Accordingly, it is principal object of the present invention to provide apparatus and a method for its use in attaching replacement frictional lining material to a face of a torque converter lock-up piston.

It is another important object of the present invention to provide apparatus which automatically provides the required amount of pressure and the required temperatures for adhesively attaching a replacement frictional lining to a face of a lock-up piston.

It is an important feature of the apparatus of the present invention that it includes an automatic timer which controls a sequence of operation of the apparatus to provide appropriate pressure for the appropriate amount of time while a lock-up piston and replacement friction lining material are heated to activate an adhesive attaching the lining material to the lock-up piston.

An important advantage of the present invention is that it provides improved control of the operation of attaching a replacement lining to a lock-up piston.

Another important advantage of the present invention is that it permits attachment of a replacement frictional lining to a lock-up piston with the expenditure of less energy than has previously been required.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
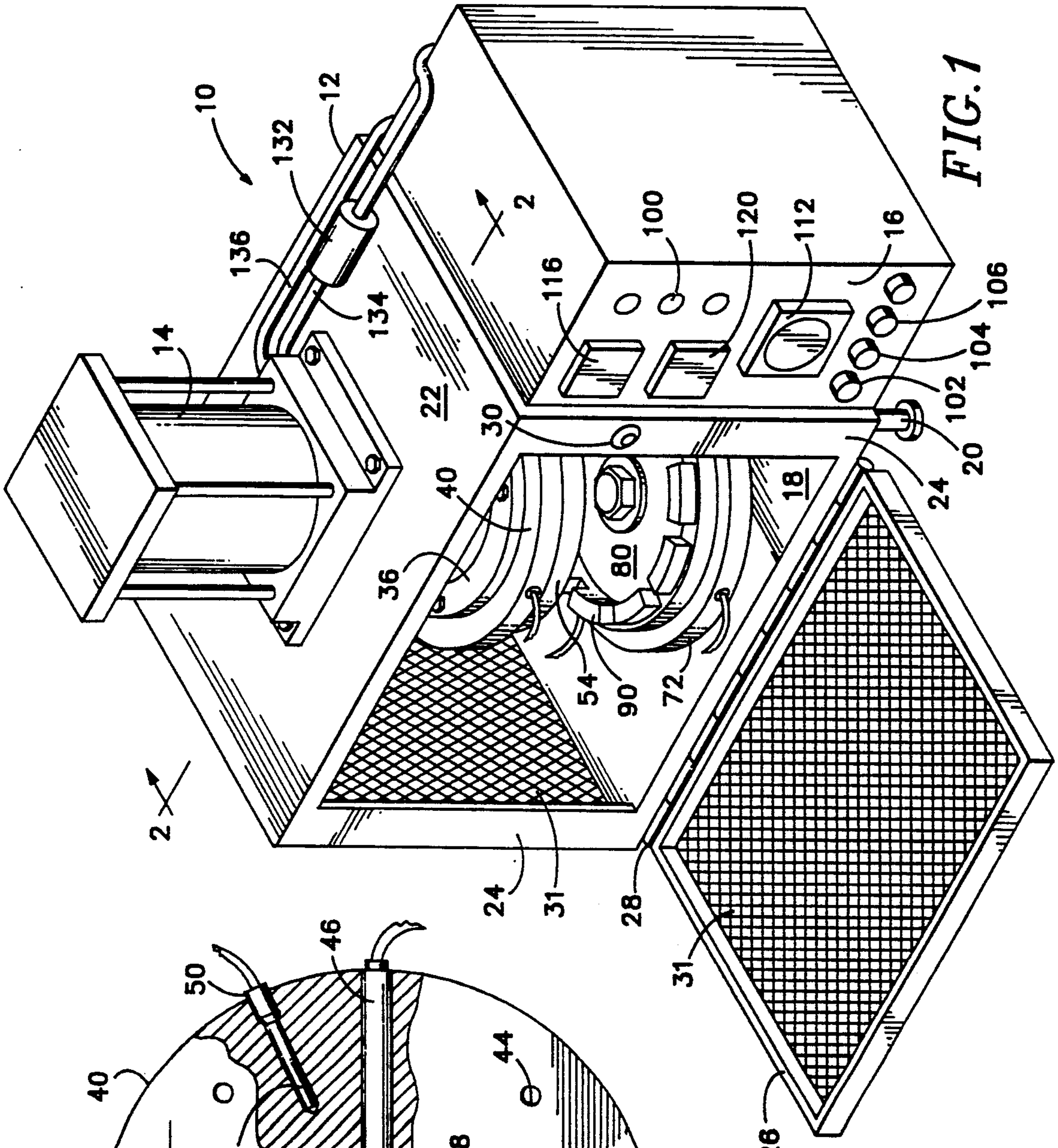
FIG. 1 is a pictorial view of an exemplary friction ring bonder for a lock-up piston of a torque converter, embodying the present invention.

Referring now to the drawing figures which form a part of the disclosure, in FIG. 1 an exemplary bonding apparatus 10 embodying the invention includes a frame 12 on which a cylinder-and-piston assembly 14 is mounted. The cylinder-and-piston assembly 14 is preferably operated by compressed air. A suitable air cylinder is available under the trademark SPEEDAIRE from Dayton Electric Manufacturing Company of Chicago, Illinois as its model 2W491, a six-inch bore, eight-inch stroke air cylinder, which is capable of providing a pressing force of 2262 pounds at an air pressure of 80 psi. An electrical control section 16 is attached to the frame 12.

The frame 12 includes a base plate 18 preferably of heavy plate steel, which may be supported by adjustable legs such as the leg 20.

An upper plate 22 is generally parallel with the base plate 18 and is attached thereto by vertical members 24, of material such as angle stock, which interconnect the upper plate 22 with the base plate 18 and are sufficiently strong to support the cylinder and piston assembly 14 and to oppose the force exerted by the cylinder and piston assembly 14 without failure.

A door 26 is attached to the frame 12, as by a hinge 28, and an interlock switch 30 is mounted so as to sense the presence of the door 26 in a closed position. Open areas defined by the frame members and in the door 26 are enclosed partly for purposes of safety by sturdy expanded metal 31 or the like to permit dissipation of excess heat while providing visual access but preventing a person's hands from being injured by operation of the apparatus 30.

Figure 3:
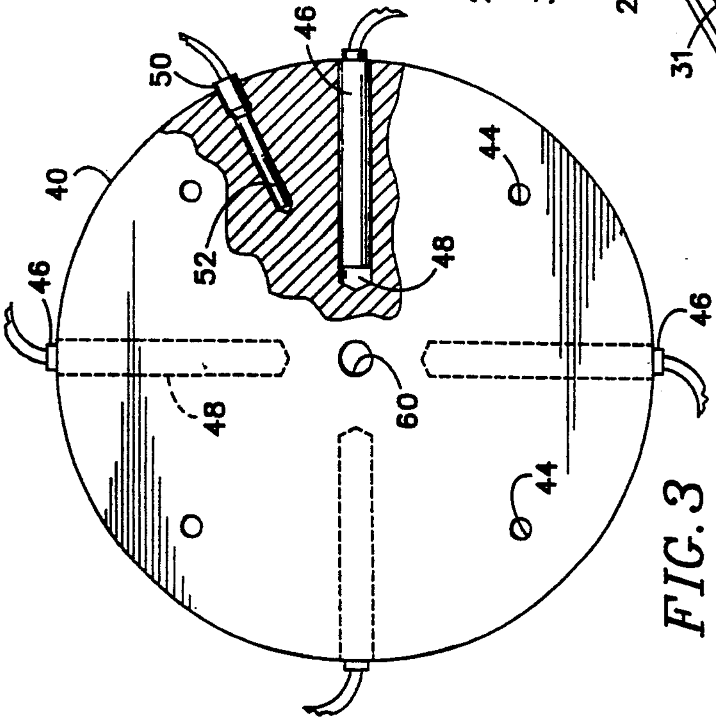
FIG. 3 is a partially cut-away face view of one of the heater plates included as part of the apparatus.
Figure 2:
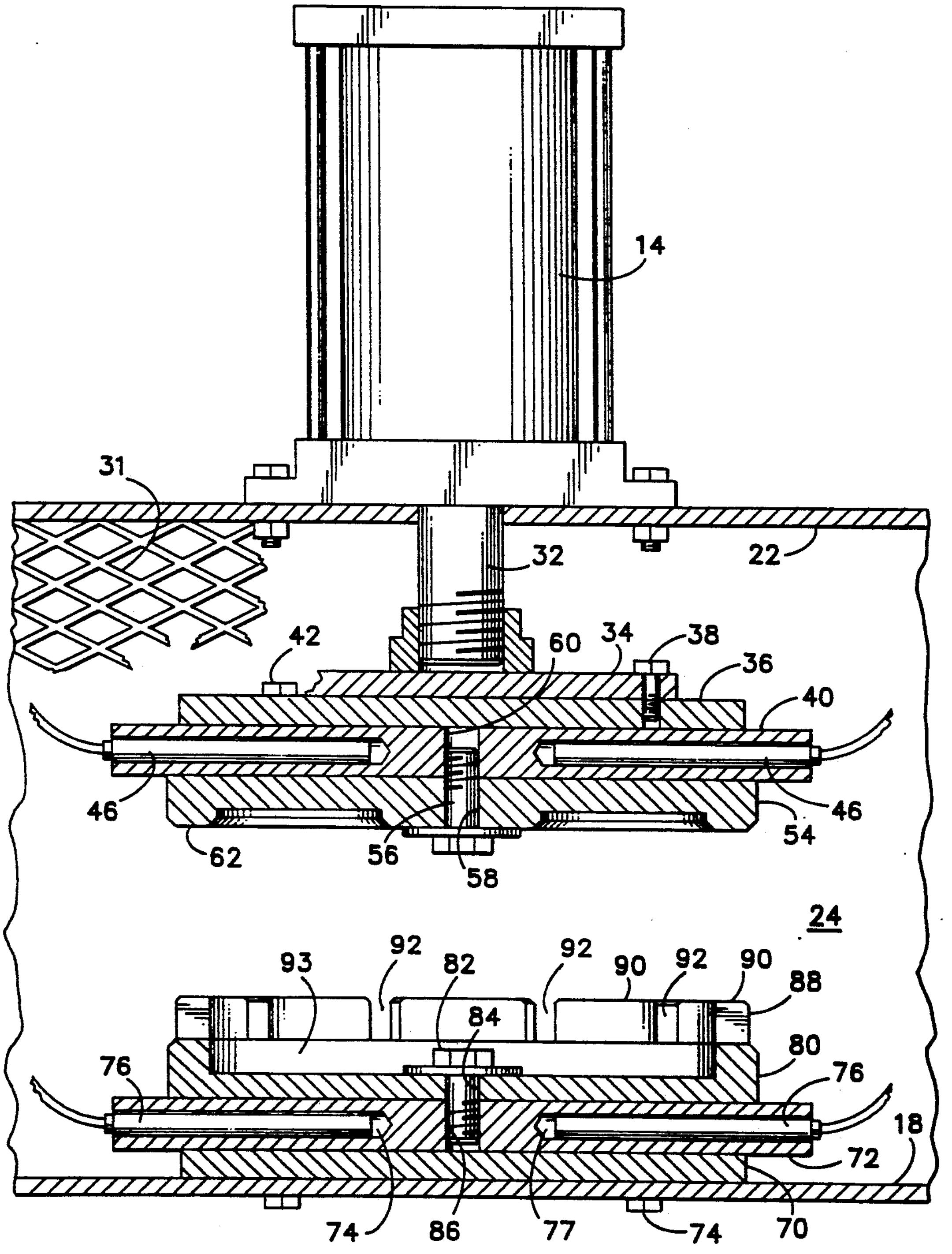
FIG. 2 is a sectional view of a portion of the apparatus shown in FIG. 1, taken along line 2—2, showing the general relationships between the heater plates, pressure plates, and cylinder-and-piston assembly of the apparatus.
Figure 4:
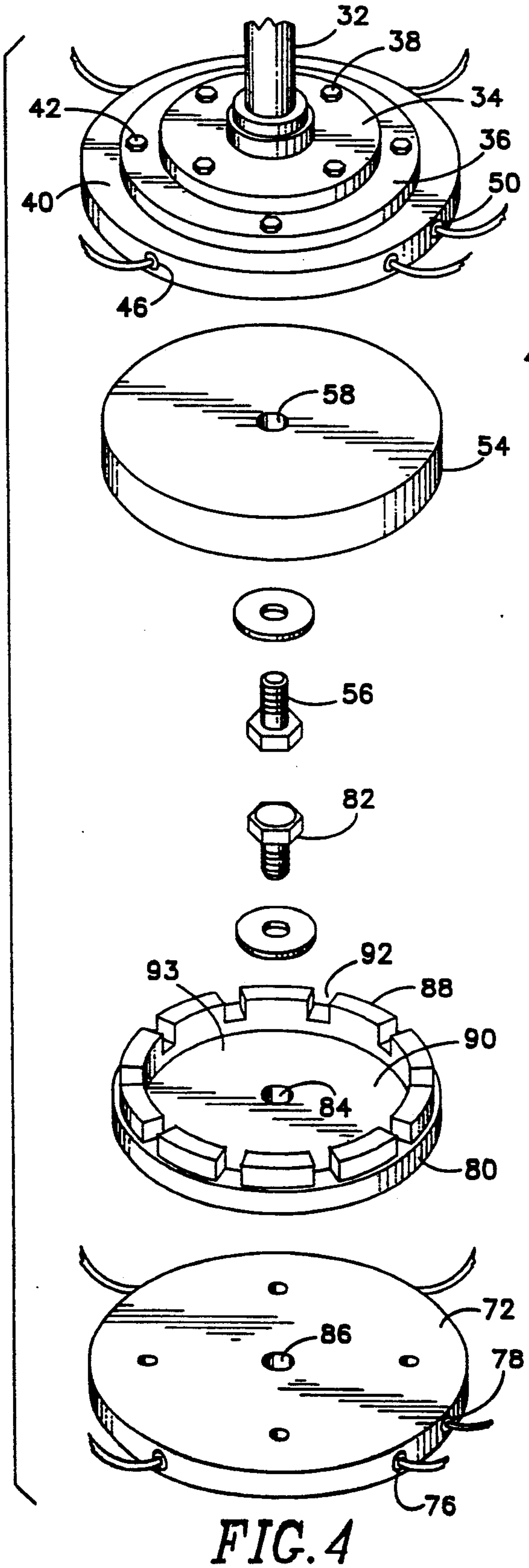
FIG. 4 is an exploded perspective view showing the manner of attachment of the pressure plates to the heater plates in the apparatus shown in FIGS. 1 and 2.

Referring now also to FIGS. 2, 3, and 4, a piston rod 32, part of the cylinder and piston assembly 14, carries a mounting plate 34. A carrier plate 36 is fastened to the mounting plate 34 by a set of bolts 38. A circular upper heater plate 40 of a material, such as aluminum, having strength and good thermal conductivity, is mounted on the carrier plate 36 by, for example, a set of mounting bolts 42 which extend through bores defined in the carrier plate 36 into threaded bores 44 defined in the upper heater plate 40, as shown in FIG. 3.

Four electrical resistance heating elements 46 are mounted in respective radial bores 48 defined in the upper heater plate 40. The bores 48 are spaced equally apart at 90° angular intervals about the circumference of the upper heater plate 40, as shown in FIGS. 2 and 3.

A temperature sensing device 50, such as an electrical resistance thermometer, is mounted in a radial bore 52 separated from one of the bores 48 by an angle of, for example, 25° about the circumference of the upper heater plate 40, as shown in FIG. 3. The bore 52 thus does not interfere with any of the threaded bores 44, which are placed medially between adjacent ones of the bores 48.

Figure 6:
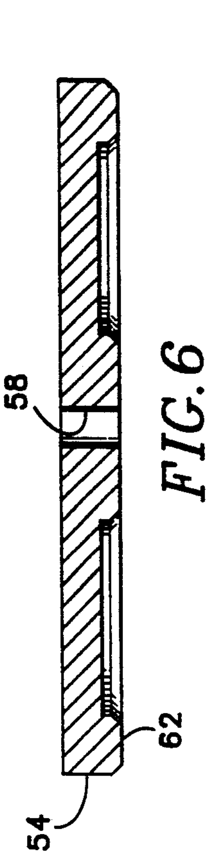
FIG. 6 is a sectional view of the upper pressure plate shown in FIG. 5, taken along line 6—6.
Figure 5:
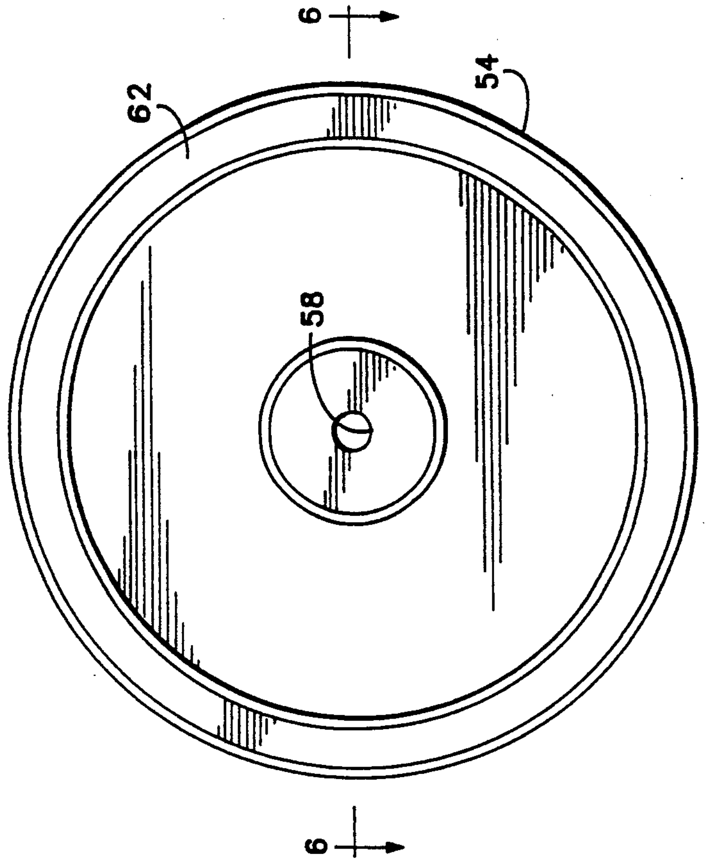
FIG. 5 is a face view of an upper pressure plate for use in the apparatus of the invention.

An upper pressure plate 54, also shown in FIGS. 5 and 6, is attached removably to the upper heater plate 40 by a central bolt 56 extending through a central bore 58 defined by the upper pressure plate into a threaded bore 60 defined in the upper heater plate 40. The upper pressure plate 54 and heater plate 40 both have mating surfaces which normally are in mutual contact with each other to transfer heat to the pressure plate 54. An annular flat pressure surface 62 is defined by the upper pressure plate 54 and corresponds to the size and shape of an annular replacement ring 96 of frictional lining material for a lock-up piston 94 for a particular type of torque converter. An area of the upper pressure plate 54 located radially inward from the annular flat pressure surface 62 may be relieved to avoid interference with upwardly-projecting portions of a lock-up piston 94. Thus, during use of the apparatus 10 heat is transferred from the upper heater plate 40 through the upper pressure plate 54, and through the annular flat pressure surface 62 into a ring 96 of frictional lining material.

Referring again to FIG. 2, a lower support plate 70 rests atop the base plate 18. A lower heater plate 72 which is substantially identical to the upper heater plate 40 is attached to the base plate 18 atop the support plate 70 by means of attachment bolts 74 extending through respective bores in the base plate 18 and support plate 70. Respective resistance heating elements 76, similar to the heating elements 46, are located in the several bores 77 defined by the lower heater plate 72, and a temperature-sensing element 78 similar to the sensing element 50 also provided.

Figure 8:
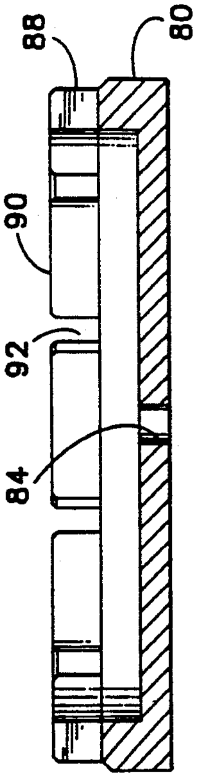
FIG. 8 is a sectional view of the pressure plate shown in FIG. 7, taken along line 8—8.
Figure 7:
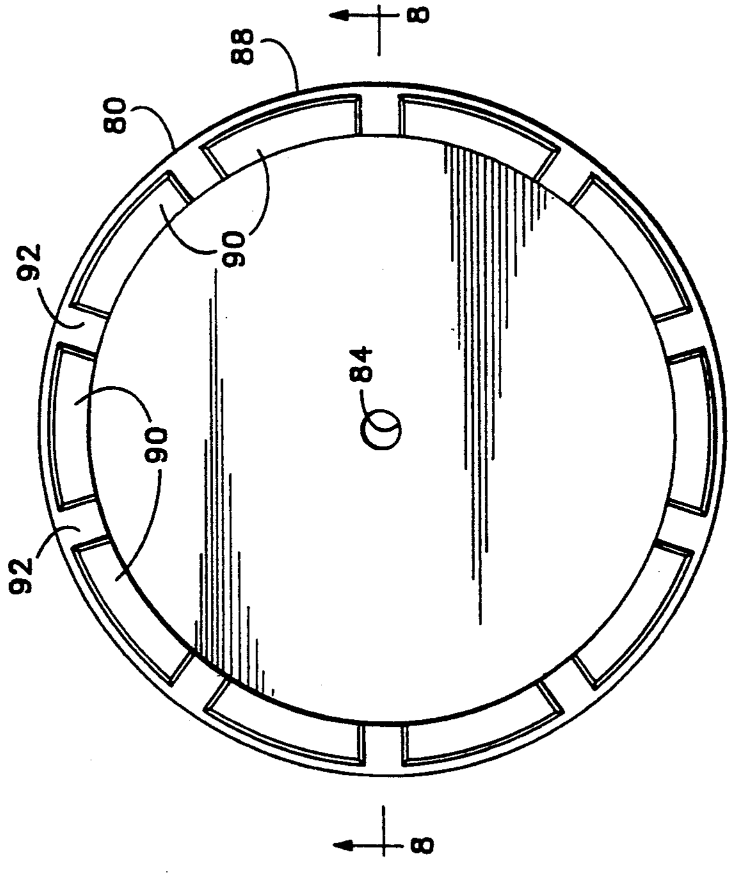
FIG. 7 is a face view of an exemplary bottom pressure plate for use as part of the apparatus.

A lower pressure plate 80, shown also in FIGS. 7 and 8, is attached to the lower heater plate 72 by an attachment bolt 82 extending through a central bore 84 defined in the lower pressure plate into a threaded bore 86 defined in the lower heater plate 72, permitting the lower pressure plate 80 to be removed and replaced conveniently. The lower pressure plate 80 preferably fits against the lower heater plate 72 matingly in order to effect efficient heat transfer from the lower heater plate 72 to the lower pressure plate 80. The lower pressure plate 80 is of any of several configurations each shaped as required to accommodate a different type of lock-up piston, such as is associated with a particular one of the many different types of automatic transmissions. The lower pressure plate 80 includes an upstanding castellated wall 88 having an upwardly facing pressure surface 90 divided into several segments by respective notches 92 which provide clearance for receiving corresponding parts of a lock-up piston of an automatic transmission. A radially inwardly located portion 93 of the lower pressure plate is relieved below the height of the pressure surface 90 to receive portions of the lock-up piston 94 without contact therewith. In particular, the lower pressure plate 80 is of a type intended to receive a lock-up piston 94 from a Chrysler automatic transmission which includes projections located opposite the surface to which the frictional lining is to be attached. Those projections fit within the notches 92 when the lock-up piston 94, shown in FIG. 5, is in proper position atop the lower pressure plate 80. For some other lock-up pistons the notches 92 need not be provided. In most, if not all, cases the lock-up piston will be of a shape permitting the pressure surface 90 to be planar, but the lock-up piston may have a backing plate or a stiffening channel which will fit around, over or within a space defined by the wall 88, to ensure proper registration and location of the lock-up piston 94 on the lower pressure plate 80.

Figure 9:
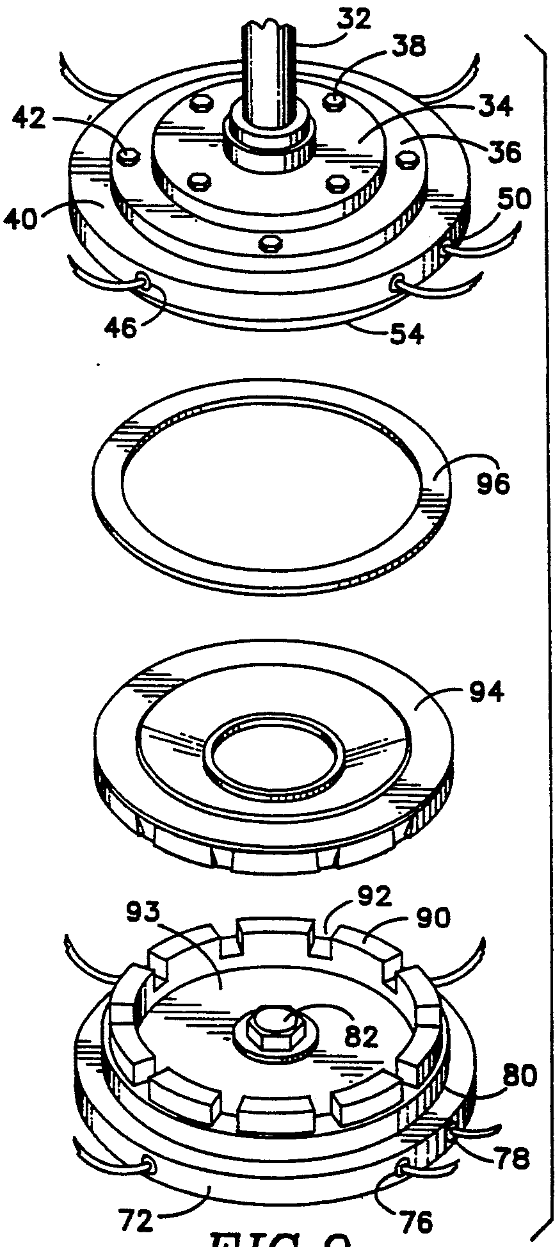
FIG. 9 is a fragmentary perspective view showing the placement of a torque converter lock-up piston and a friction ring to be bonded thereto by use of the apparatus of the invention.

The lower pressure plate 80 is located below the upper pressure plate 54, and is configured to receive the lock-up piston 94 in a position aligned with the upper pressure plate 54, with the pressure surface 90 supporting the portion of the lock-up piston 94 to which the ring 96 of frictional lining material, shown in FIG. 9, is to be attached by utilization of the apparatus 10 according to the present invention.

Figure 10:
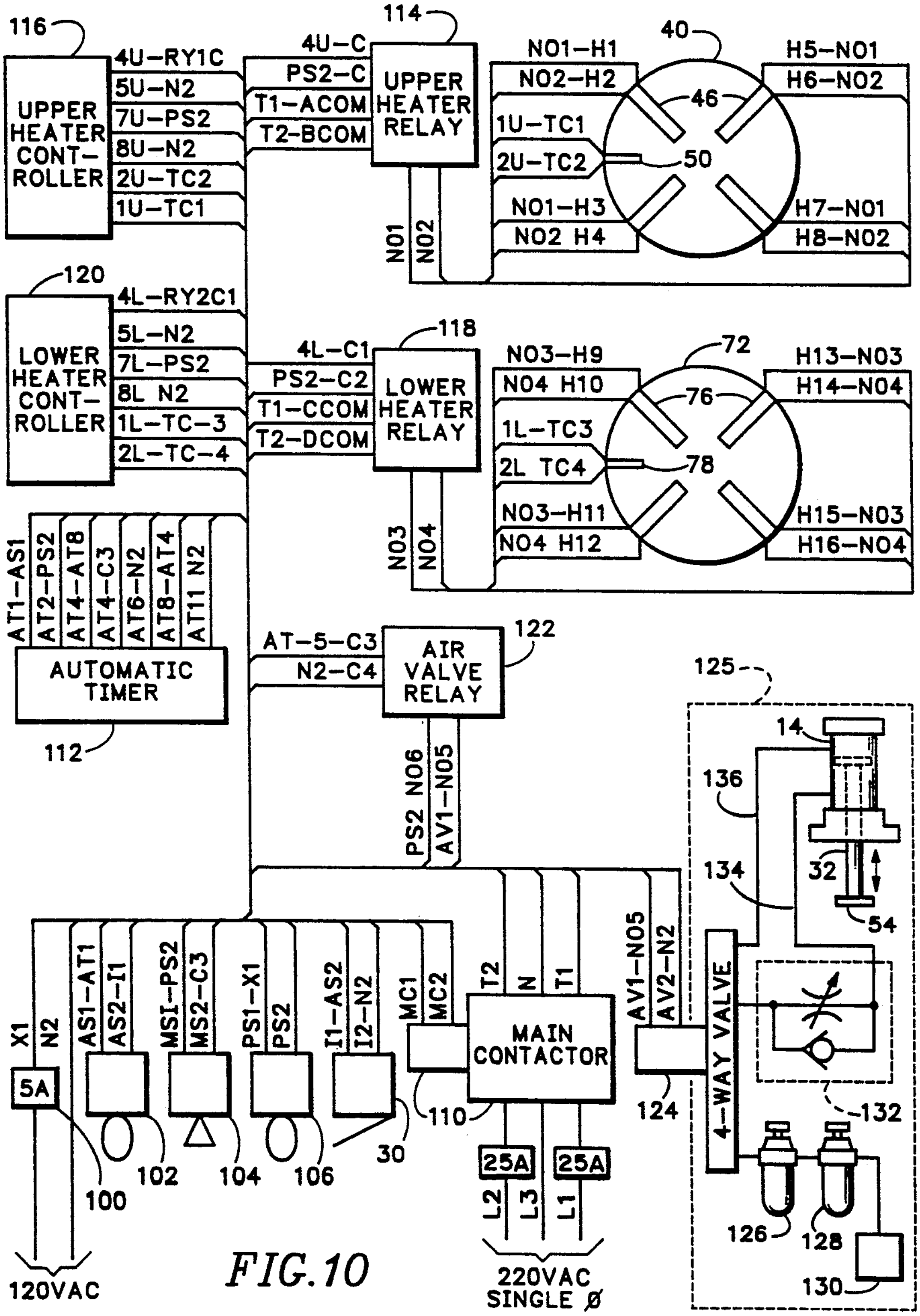
FIG. 10 is a simplified schematic diagram showing the operational control elements and power distribution of the apparatus shown in FIG. 1.

Referring now again to FIG. 1 and also to FIG. 10, the electrical control portion of the apparatus according to the present invention includes a main circuit breaker 100, an "automatic on" switch 102, a push button manual override switch 104, a main power switch 106, the safety interlock switch 30, and a main heater power control relay 110.

An adjustable automatic timer 112 is provided to control the sequence and time of a cycle of operation of the apparatus 10. The automatic timer 112 may, for example, be a motor timer available from Omron Electronics, Inc. of Schaumburg, Illinois, as its Model SYD, catalog No. L05-E3-3.

Electrical power for the heating elements 46 of the upper heating plate 40 is provided through a relay 114 controlled by an upper temperature controller 116. Electrical power to the heating elements 76 of the lower heater plate 72 is provided similarly through a relay 118 controlled by a lower temperature controller 120. A temperature controller available from Omron Electronics, Inc. of Schaumburg, Illinois, as its model E5C, is suitable for use as each of the upper and lower heater controls 116, 120. Feedback is provided to the respective temperature controllers 116 and 120 through the temperature sensing elements 50 and 78.

A relay 122 controlled by the automatic timer 112 and the interlock switch 30 provides power to operate a solenoid-operated four-way air valve 124 to control operation of the compressed air system 125. A suitable air valve 124 is a model 1A209 single solenoid, four-way air valve available under the trademark SPEEDAIRE from Dayton Electric Manufacturing Company of Chicago, Illinois, as its model No. 1A209. Such a valve is capable of handling air pressures up to 150 psi at a flow rate of 90 cubic feet per minute at 80 psi, and has a control solenoid operated at 120 volts, 60 hertz.

An air supply 130 provides pressurized air to the valve 124, by way of a lubricator 126 and a filter/-regulator 128. A suitable filter/regulator is available from Dayton Electric Manufacturing Company of Chicago, Illinois as its SPEEDAIRE brand piggyback filter/regulator, model 4Z029. A suitable lubricator 126 is also available from Dayton Electric Manufacturing Company of Chicago, Illinois, as its SPEEDAIRE brand air line mini-lubricator, model 2Z768B.

An adjustable flow regulating valve 132 in an air supply line 134 allows free flow of air into the lower end of the cylinder-and-piston assembly 14 to raise the piston and the associated upper pressure plate 54 freely, while limiting the speed at which air can be exhausted from the lower end of the air cylinder-and-piston assembly 14, so as to control the speed at which the piston can force the upper pressure plate 54 downward when pressurized air is directed through air supply line 136 to the upper end of the cylinder-and-piston assembly 14. When the solenoid of the air valve 124 is not activated the valve 124 returns to a position directing pressurized air through air supply line 134 to raise the upper pressure plate 54.

In use of the apparatus 10, the upper and lower heater plates 40 and 72, respectively, are heated electrically by the several heating elements 46 and 76 under control of the upper heater controller 116 and lower heater controller 120, respectively, in response to the temperatures sensed by the temperature-sensing elements 50 and 78 respectively. Preferably, the upper heater controller 116 is set to maintain a temperature of 400° F. in the upper heater plate 40, while the lower heater controller 120 is set to maintain a temperature of 450° F. in the lower heater plate 72, with the appropriate upper pressure plate 54 and lower pressure plate 80 attached, respectively, to the heater plates 40 and 72.

When the pressure plates 54 and 80 have had ample time to reach operating temperature, the door 26 is opened. With the door 26 open the interlock switch 30 interrupts power to the air valve relay 122 and the air valve 124 causes the piston rod 32 to be retracted, so that the upper pressure plate 54 is held at its maximum space away from the lower pressure plate 80. A lock-up piston, such as the Chrysler lock-up piston 94 shown in FIG. 4, is placed atop the lower pressure plate 80. The ring 96 of frictional lining material, already provided with a coating of a thermally activated adhesive material on its underside, is placed in the correct position atop the lock-up piston 94. Thereafter, the door 26 is closed, closing the interlock switch 30. Closing the door 26 and the interlock switch 30 operates the "automatic on" control switch 102 and initiates the operation of the automatic timer 112, which then operates the air valve relay 122 to cause the air valve 124 to lower the piston of the cylinder-and-piston assembly 14. This brings the upper pressure plate 54 down against the ring 96 and the lock-up piston 94 supported by the lower pressure plate 80 and applies pressure to compress the assembly with a total force of about 1250 pounds, preferably, as controlled by adjustment of the filter regulator 128. After application of pressure has continued for an appropriate time at the desired temperature, the automatic timer 112 deenergizes the relay 122, and the air valve 124 causes the upper pressure plate 54 to be raised by the cylinder-and-piston assembly 14. The automatic timer 112 is adjustable for the appropriate length of time for holding the heated upper and lower pressure plates 54 and 80 pressed toward one another on opposite sides of the lock-up piston 94 and ring 96, with a normal time being about 2½ minutes with the temperatures and pressure disclosed above.

When the door 26 is opened after the upper pressure plate 54 has been raised the "automatic on" switch 102 resets the timer 112 to be ready for the next cycle of operation.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Apparatus for fastening a lining of friction material to a lock-up piston of a torque converter, comprising:

(a) a base plate:

(b) an upper plate;

(c) support means for interconnecting said base plate with said upper plate and supporting said upper plate a predetermined distance above said base plate, defining a space between said base plate and said upper plate;

(d) a lower heater plate associated with said base plate;

(e) an upper heater plate located in said space, between said lower heater plate and said upper plate;

(f) motor means associated with said upper plate, for interconnecting said upper heater plate with said upper plate and moving said upper heater plate controllably toward and away from said lower heater plate;

(g) a circular lower pressure plate located atop and attached to said lower heater plate, said lower pressure plate including an upstanding generally annular wall, said wall defining a cavity for receiving a portion of a lock-up piston supported on said pressure plate;

(h) an upwardly facing pressure surface, defined by said wall, for supporting said lock-up piston atop said lower pressure plate;

(i) a circular upper pressure plate located beneath and attached to said upper heater plate and movable therewith in response to operation of said motor means, said upper pressure plate including an annular flat pressure surface facing downward toward said upwardly facing pressure surface;

(j) safety enclosure means for restricting human access to said space, said enclosure means including openable door means for selectively giving access to said space for placement of lock-up pistons and frictional lining material in appropriate locations with respect to said pressure plates and for removal of said lock-up pistons after fastening of said frictional lining material thereto;

(k) adjustable means for controlling the temperatures of said upper and lower heater plates; and (l) automatic control means for causing said motor means to move said upper heater plate toward said lower heater plate, to urge said upper pressure plate toward said lower pressure plate, and to press said frictional lining material and said lock-up piston together with a predetermined force for a predetermined amount of time and thereafter to move said upper heater plate away from said lower heater plate to permit removal of said lock-up piston and frictional lining material from between said upper and lower pressure plates, said automatic control means being responsive to opening of said door means to cause said motor means to move said upper heater plate away from said lower heater plate immediately upon opening of said door means.

2. The apparatus of claim 1 wherein said lower heater plate defines a first central bore and said circular lower pressure plate defines a second central bore, and further including removable fastener means extending through said second central bore into said first central bore for removably fastening said lower pressure plate to said lower heater plate in close contact therewith.

3. The apparatus of claim 2 wherein said upper heater plate defines a third central bore and said upper pressure plate defines a fourth central bore, and further including removable fastener means extending through said fourth central bore into said third central bore for removably fastening said upper pressure plate to said upper heater plate in close contact therewith.

4. The apparatus of claim 1 further including a lower support plate attached to said base plate, wherein said lower heater plate is attached to said lower support plate.

5. The apparatus of claim 1 wherein said generally annular wall means of said lower pressure plate is castellated, defining a plurality of notches for receiving correspondingly located parts of said lock-up piston, said notches dividing said upwardly facing pressure surface into a plurality of segments.

6. The apparatus of claim 1 wherein said motor means includes means for restricting the speed at which said motor means can move said upper heater plate toward said lower heater plate, while providing for said motor to move said upper heater plate away from said lower heater plate at a greater speed.

7. The apparatus of claim 1 including control means for separately controlling the temperature of each of said upper and lower heater plates.

8. The apparatus of claim 1 wherein said automatic control means includes means for controlling said motor means to exert a variable amount of force urging said upper pressure plate toward said lower pressure plate to press said frictional lining material against said lock-up piston.

* * * * *